June 1, 1926. 1,587,228
O. H. HELFRICK
FLAT TIRE SIGNAL
Filed July 25, 1925
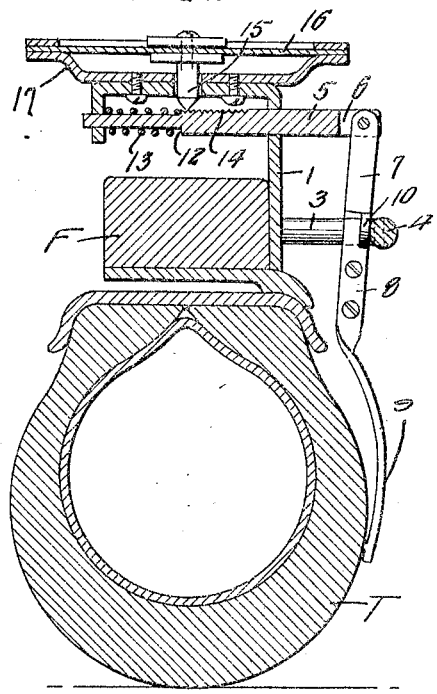
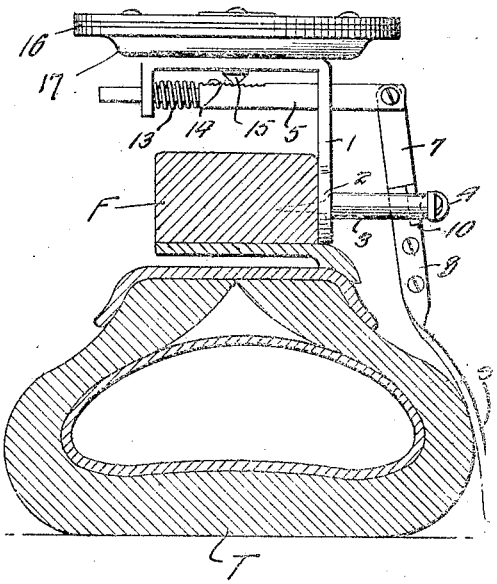
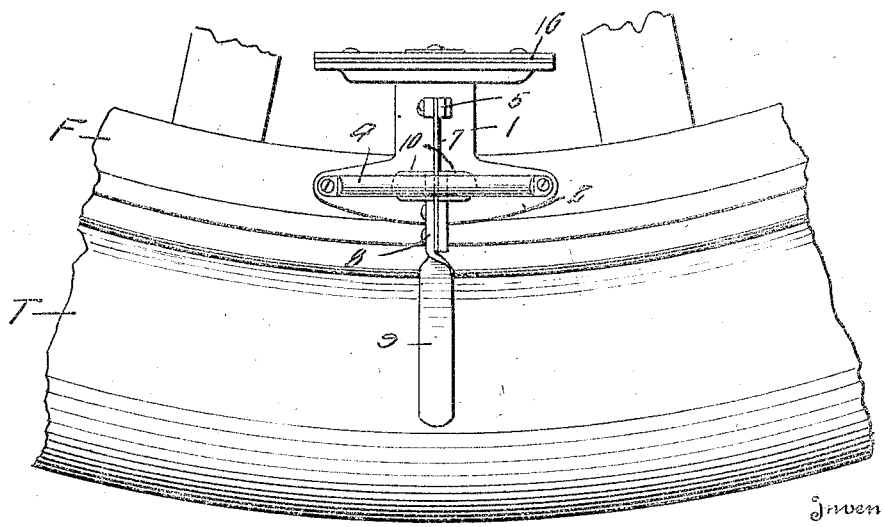
Inventor
Otto H. Helfrick
By Lester L. Sargent
Attorney Patented June 1, 1926.

1,587,228

UNITED STATES PATENT OFFICE.

OTTO H. HELFRICK, OF ELKHART, INDIANA, ASSIGNOR OF ONE-HALF TO HARLIE O. PUTT, OF ELKHART, INDIANA.

FLAT-TIRE SIGNAL.

Application filed July 25, 1925. Serial No. 46,152.

The object of my invention is to provide an inexpensive and simple device for sounding an audible alarm to warn the motorist of tire deflation before serious damage is done to the tire. I attain the objects of my invention by the device illustrated in the accompanying drawings, in which—

Figure 1 is a transverse section through the invention applied to a tire;

Fig. 2 is a front elevation of the device with the tire shown in section; and

Fig. 3 is a side elevation of the invention applied to a tire.

Like characters of reference designate like parts in each of the several views.

Referring to the accompanying drawings, I provide a frame or bracket 1 affixed to rim F which carries the usual tire T. In bracket 1 is slidably mounted a suitable signal operating plunger 5 having a bifurcated end 6 to which a flexible flat steel spring 7 is pivotally connected. Attached to spring 7 is an arm or lever 8 bent so that its lower end 9 lies flat on the side of the tire. I provide a guide 4 supported by studs 3 which are fastened to the bracket 1, as shown in Fig. 3. I also provide opposite tongues 10 on or attached to arm 8 and positioned to slidably contact with the guide bar 4. I provide a suitable spring 13 bearing against the shouldered portion 12 of plunger 5 and against the down-turned end of bracket 1, as shown in Figs. 1 and 2.

I may provide any suitable audible signal device operatively connected with and adapted to be actuated or operated by plunger 5. One form of audible signal is illustrated in the drawings and consists of a bracket 17 mounted on the bracket 1 and on which a thin metal plate 16 is fastened. The plate 16 carries a pointed stud of suitable length to contact with the toothed portion 14 of plunger 5, as shown in Figs. 1 and 2.

In operation, when the tire becomes somewhat deflated it will press against the lower end 9 of arm or lever 8 moving it outwardly, as shown in Fig. 2, thus forcing the plunger 5 inwardly and actuating the audible signal. The flat spring 7 to which the arm or lever 8 is attached permits of a lateral movement whereby to prevent breaking the device if end 9 contacts with the ground. If the tire is deflated the signal will be operated at each revolution of the wheel or tire. If the tire is fully inflated there will be no movement of the arm or lever. The device is arranged and constructed to automatically resume its normal position when displaced by striking an obstruction in the road or by coming into contact with the side of a deep rut or other obstruction tending to move the arm in a plane with the rotation of the wheel or tire.

It is within the contemplation of my invention to provide any suitable audible signal such as a squawker device as shown or a bell or whistle.

What I claim is:

1. The combination of a bracket adapted to be attached to the rim of an automobile wheel, a plunger slidably mounted in the bracket, a spring normally holding the plunger in an outermost position, an audible signal arranged to be operated by the movement of the plunger, a flexible spring operatively attached to said plunger, and a flexible arm attached to the flexible spring and having a lower portion bent to contact with the side of the tire approximately midway thereof when the latter is partially deflated.

2. The combination of a bracket adapted to be attached to the rim of an automobile wheel, a plunger slidably mounted in the bracket, said plunger having a toothed portion, a spring normally holding the plunger in an outermost position, a disk-supporting member, a thin metal disk mounted on the disk-supporting member, a pointed stud affixed to the disk and positioned to flexibly engage the toothed portion of the plunger when the latter is operated, to cause an audible alarm signal, a flexible spring operatively attached to the plunger, an arm attached to the flexible spring and having the lower portion bent to contact with the side of the tire when the latter becomes deflated.

3. The combination of a bracket adapted to be attached to the rim of an automobile wheel, a plunger slidably mounted in the bracket, said plunger having a toothed portion, a spring normally holding the plunger in an outermost position, a disk-supporting member, a thin metal disk mounted on the disk-supporting member, a pointed stud affixed to the disk and positioned to flexibly engage the toothed portion of the plunger when the latter is operated, to cause an audible alarm signal, a flexible spring operatively attached to the plunger, an arm attached to the flexible spring and having the lower portion bent to contact with the side of the tire when the latter becomes deflated, and a guide element with which the arm may contact to function as a fulcrum for the arm.

4. The combination of a bracket adapted to be attached to the rim of an automobile wheel, a plunger slidably mounted in the bracket, said plunger having a toothed portion, a spring normally holding the plunger in an outermost position, a disk-supporting member, a thin metal disk mounted on the disk-supporting member, a pointed stud affixed to the disk and positioned to flexibly engage the toothed portion of the plunger when the latter is operated, to cause an audible alarm signal, a flexible flat spring operatively attached to the plunger, an arm attached to the flexible flat spring and having the lower portion bent to contact with the side of the tire when the latter becomes deflated, and a guide element with which the arm may contact to function as a fulcrum for the arm.

OTTO H. HELFRICK.